United States Patent
Lee et al.

(10) Patent No.: US 12,373,483 B2
(45) Date of Patent: Jul. 29, 2025

(54) METHOD AND SYSTEM OF PROVIDING INTERFACE FOR VISUAL QUESTION ANSWERING

(71) Applicants: Hyundai Motor Company, Seoul (KR); Kia Corporation, Seoul (KR); SEOUL NATIONAL UNIVERSITY R&DB FOUNDATION, Seoul (KR)

(72) Inventors: Kang Il Lee, Incheon (KR); Heeseung Yun, Seoul (KR); Youngjae Yu, Seattle, WA (US); Gunhee Kim, Seoul (KR); Wonsuk Yang, Jeollabuk-do (KR)

(73) Assignees: Hyundai Motor Company, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 320 days.

(21) Appl. No.: 18/081,421

(22) Filed: Dec. 14, 2022

(65) Prior Publication Data

US 2023/0214418 A1    Jul. 6, 2023

(30) Foreign Application Priority Data

Dec. 30, 2021 (KR) .................. 10-2021-0192110

(51) Int. Cl.
*G06F 16/532* (2019.01)
*G06T 5/50* (2006.01)
(Continued)

(52) U.S. Cl.
CPC .............. *G06F 16/532* (2019.01); *G06T 5/50* (2013.01); *G06V 10/764* (2022.01); *G06V 20/60* (2022.01); *G06T 2207/20221* (2013.01)

(58) Field of Classification Search
CPC ..... G06F 16/532; G06F 16/5866; G06T 5/50; G06T 2207/20221; G06T 3/4038;
(Continued)

(56) References Cited

FOREIGN PATENT DOCUMENTS

CN    113434035 B    *    3/2022

OTHER PUBLICATIONS

"Andrew MacQuarrie et al., Cinematic Virtual Reality: Evaluating the Effect of Display Type on the Viewing Experience for Panoramic Video, Mar. 2017, 2017 IEEE Virual Reality, Los Angeles, CA, USA" (Year: 2017).*

(Continued)

*Primary Examiner* — Chineyere Wills-Burns
*Assistant Examiner* — Phuong Hau Cai
(74) *Attorney, Agent, or Firm* — Fox Rothschild LLP

(57) ABSTRACT

A method of providing an interface for visual question answering includes receiving 360-degree video data, acquiring a plurality of images corresponding to a plurality of fields of view (FOV) based on the 360-degree video data, identifying a plurality of objects included in the plurality of images and storing metadata regarding the plurality of objects, converting plane coordinates of each of the plurality of objects into spherical coordinates, classifying the plurality of objects into a plurality of lists, selecting a first object having a highest correct answer probability, comparing the spherical coordinates of the first object having the highest correct answer probability with the spherical coordinates of each of the remaining first objects, and removing a first object satisfying a preset condition among the remaining first objects from the plurality of images, and generating an interface for visual question answering.

18 Claims, 13 Drawing Sheets

(51) Int. Cl.
*G06V 10/764* (2022.01)
*G06V 20/60* (2022.01)

(58) Field of Classification Search
CPC ........ G06T 5/77; G06V 10/764; G06V 20/60;
G06V 20/70; G06V 10/30; G06V 10/12;
G06V 10/751; G06V 2201/10; H04N
13/178; H04N 13/194
See application file for complete search history.

(56) References Cited

OTHER PUBLICATIONS

"Heeseung Yun et al., Pano-AVQA: Grounded Audio-Visual Question Answering on 360 degree Videos, 2021, proceedings of the IEEE/CVF International Conference on Computer Vision (ICCV), 2021, pp. 2031-2041" (Year: 2021).*
Fulgencio Canovas-Garcia et. al. "Optimal Combination of Classification Algorithms and Feature Ranking Methods for Object-Based Classification of Submeter Resolution Z/I-Imaging DMC Imager, 2015, Remote Sens. 2015, 7, 4651-4677"(Year: 2015).*
Yun et al., "Pano-AVQA: Grounded Audio-Visual Question Answering on 360_ Videos".

* cited by examiner

FIG. 1
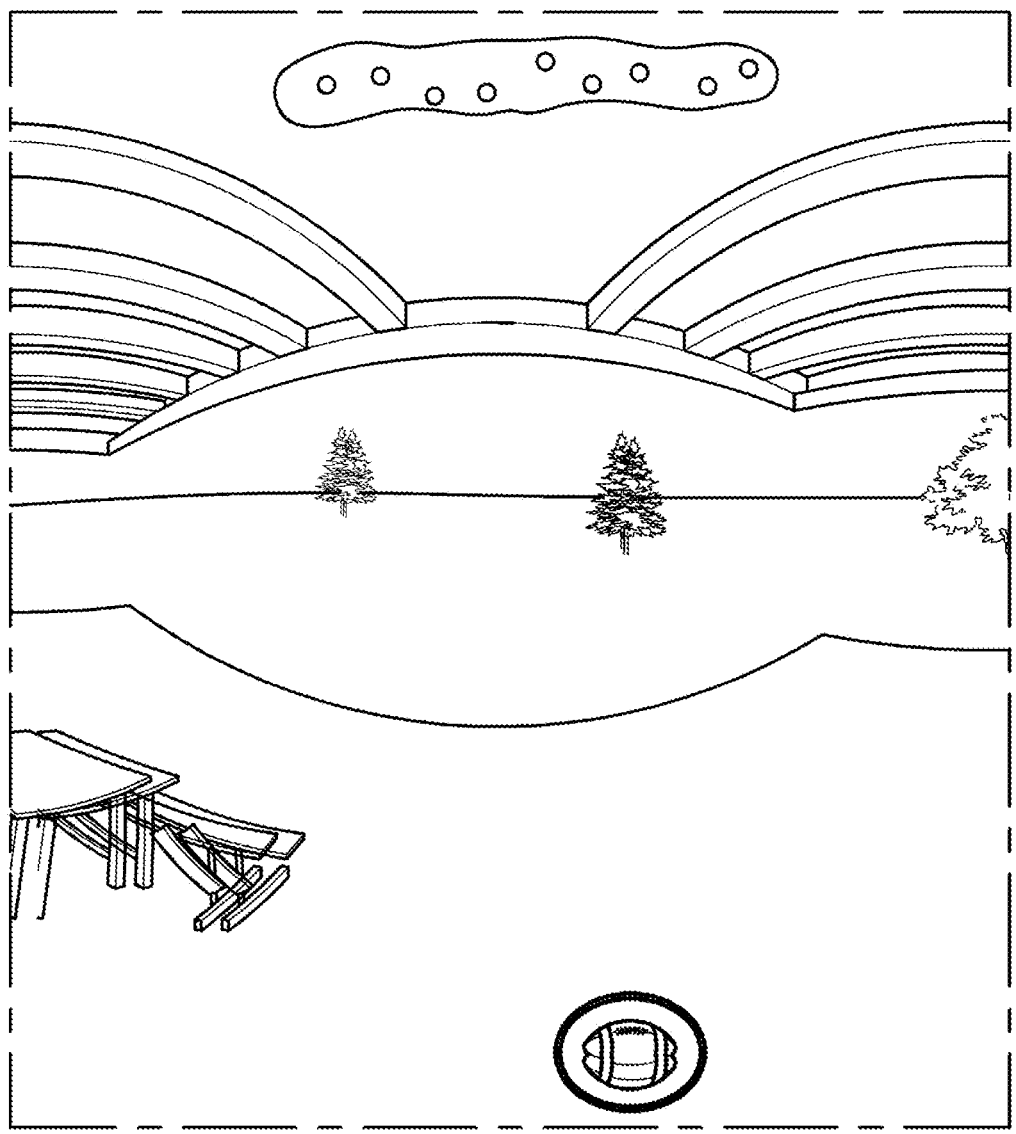
Q. Visual description of 
A. _____

FIG. 7

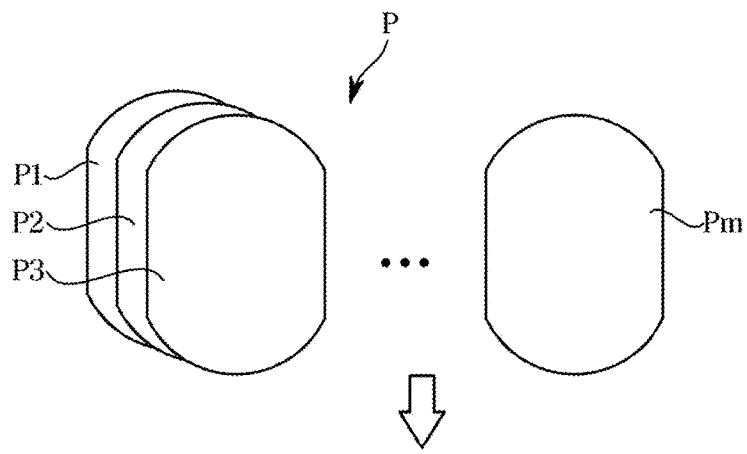

| | 0.84 | 0.75 | 0.3 | |
|---|---|---|---|---|
| FIRST LABEL | P ($r_{11a}$, $\theta_{11a}$, $\phi_{11a}$)<br>P ($r_{12a}$, $\theta_{12a}$, $\phi_{12a}$)<br>P ($r_{13a}$, $\theta_{13a}$, $\phi_{13a}$)<br>P ($r_{14a}$, $\theta_{14a}$, $\phi_{14a}$) | P ($r_{11b}$, $\theta_{11b}$, $\phi_{11b}$)<br>P ($r_{12b}$, $\theta_{12b}$, $\phi_{12b}$)<br>P ($r_{13b}$, $\theta_{13b}$, $\phi_{13b}$)<br>P ($r_{14b}$, $\theta_{14b}$, $\phi_{14b}$) | P ($r_{11c}$, $\theta_{11c}$, $\phi_{11c}$)<br>P ($r_{12c}$, $\theta_{12c}$, $\phi_{12c}$)<br>P ($r_{13c}$, $\theta_{13c}$, $\phi_{13c}$)<br>P ($r_{14c}$, $\theta_{14c}$, $\phi_{14c}$) | ... |
| | 0.76 | 0.4 | 0.2 | |
| SECOND LABEL | P ($r_{21a}$, $\theta_{21a}$, $\phi_{21a}$)<br>P ($r_{22a}$, $\theta_{22a}$, $\phi_{22a}$)<br>P ($r_{23a}$, $\theta_{23a}$, $\phi_{23a}$)<br>P ($r_{24a}$, $\theta_{24a}$, $\phi_{24a}$) | P ($r_{21b}$, $\theta_{21b}$, $\phi_{21b}$)<br>P ($r_{22b}$, $\theta_{22b}$, $\phi_{22b}$)<br>P ($r_{23b}$, $\theta_{23b}$, $\phi_{23b}$)<br>P ($r_{24b}$, $\theta_{24b}$, $\phi_{24b}$) | P ($r_{21c}$, $\theta_{21c}$, $\phi_{21c}$)<br>P ($r_{22c}$, $\theta_{22c}$, $\phi_{22c}$)<br>P ($r_{23c}$, $\theta_{23c}$, $\phi_{23c}$)<br>P ($r_{24c}$, $\theta_{24c}$, $\phi_{24c}$) | ... |
| | 0.9 | 0.81 | 0.73 | |
| THIRD LABEL | P ($r_{31a}$, $\theta_{31a}$, $\phi_{31a}$)<br>P ($r_{32b}$, $\theta_{32b}$, $\phi_{32b}$)<br>P ($r_{33a}$, $\theta_{33a}$, $\phi_{33a}$)<br>⋮ | P ($r_{31b}$, $\theta_{31b}$, $\phi_{31b}$)<br>P ($r_{32b}$, $\theta_{32b}$, $\phi_{32b}$)<br>P ($r_{33c}$, $\theta_{33c}$, $\phi_{33c}$)<br>⋮ | P ($r_{31c}$, $\theta_{31c}$, $\phi_{31c}$)<br>P ($r_{32c}$, $\theta_{32c}$, $\phi_{32c}$)<br>P ($r_{33c}$, $\theta_{33c}$, $\phi_{33c}$)<br>⋮ | ... |
| ⋮ | ⋮ | ⋮ | ⋮ | ⋮ |

METHOD AND SYSTEM OF PROVIDING INTERFACE FOR VISUAL QUESTION ANSWERING

CROSS-REFERENCE TO RELATED APPLICATION

This application is based on and claims priority under 35 U.S.C. § 119 to Korean Patent Application No. 10-2021-0192110, filed on Dec. 30, 2021, in the Korean Intellectual Property Office, the disclosure of which is incorporated herein by reference.

BACKGROUND

1. Field

The present disclosure relates to a method and system for providing an interface for visual question answering that enables an annotator to easily recognize an image.

2. Background

A question answering (QA) system is a system for training an artificial intelligence (AI) model through a question about an image and an answer to the question.

A computing device equipped with an AI model may identify an object based on an input video, and provide an interface for visual question answering including a question about the identified object.

An annotator may provide the AI model with an answer to the question, thereby training the AI model.

An example of the input video may include a panoramic video, but since the panoramic video includes a spatial structure different from that usually perceived by a human, the annotator may have a difficulty in providing an accurate answer to the question.

SUMMARY

The present disclosure may generate a panorama image that is easy to be recognized by an annotator by removing a noise object included in a panorama image.

The present disclosure may generate a panorama image that is easy to be recognized by an annotator by reducing distortion of a panorama image.

The present disclosure may generate a panorama image that is easy to be recognized by an annotator by reducing discontinuity of a panorama image.

The technical objectives of the disclosure are not limited to the above, and other objectives may become apparent to those of ordinary skill in the art based on the following descriptions.

According to an aspect of the disclosure, there is provided a method of providing an interface for visual question answering, the method including: receiving 360-degree video data; acquiring a plurality of images corresponding to a plurality of fields of view (FOV) based on the 360-degree video data; identifying a plurality of objects included in the plurality of images and storing metadata regarding the plurality of objects; the metadata including plane coordinates of a plane coordinate system, converting the plane coordinates of each object of the plurality of objects into respective spherical coordinates of a spherical coordinate system based on the stored metadata; classifying the plurality of objects into a plurality of lists according to labels based on the stored metadata; selecting a first object having a highest correct answer probability from among a plurality of first objects included in a first list corresponding to a first label from among the plurality of lists; comparing the spherical coordinates of the first object having the highest correct answer probability to the spherical coordinates of each of the remaining first objects, and removing, based on a result of the comparison, a first object satisfying a preset condition among the remaining first objects from the plurality of images; and generating an interface for visual question answering, the interface being based on the plurality of images in which the first object satisfying the preset condition is removed by the removing step.

The method may further include: selecting a second object having a highest correct answer probability from among a plurality of second objects included in a second list corresponding to a second label from among the plurality of lists; comparing the spherical coordinates of the second object having the highest correct answer probability to the spherical coordinates of each of the remaining second objects of the plurality of second objects, and removing, based on a result of the comparison, a second object satisfying a preset condition among the remaining second objects from the plurality of images; and wherein the generating an interface for visual question answering step is based on the plurality of images in which the second object satisfying the preset condition is removed.

In a spherical coordinate system, the removed first object satisfying the preset condition overlaps the first object having the highest correct answer probability by an overlapping area amount that is greater than or equal to a threshold area.

The classifying of the plurality of objects into the plurality of lists according to labels may include arranging the plurality of first objects in a descending order based on a correct answer probability to generate the first list, and the selecting of the first object having the highest correct answer probability may include selecting a first object arranged first in the first list.

The method may further include: adopting the first object having the highest correct answer probability as a correct answer for the first label and removing the first object having the highest correct answer from the first list; and removing the first object satisfying the preset condition from the first list.

The method may further include, until all of the plurality of first objects in the first list are removed, repeatedly performing the following steps: (a) the selecting of the first object having the highest correct answer probability; (b) the adopting of the first object having the highest correct answer probability as a correct answer for the first label, (c) the removing the first object having the highest correct answer from the first list; and (d) the removing of the first object satisfying the preset condition from the first list.

The generating of the interface for the visual question answering may include processing the plurality of images in which the first object satisfying the preset condition is removed, to generate a panorama image in a specific viewpoint.

The generating of the interface for the visual question answering may include, based on a discontinuous object being identified on at least one side of the panorama image, performing a correction for adding an image including at least a portion of the discontinuous object to the at least one side of the panorama image.

The generating of the interface for the visual question answering may include performing a correction for adding an image corresponding to an upper view with respect to the specific viewpoint among the plurality of images to one side of the panorama image.

The generating of the interface for the visual question answering may include performing a correction for adding an image corresponding to a lower view with respect to the specific viewpoint among the plurality of images to one side of the panorama image.

According to another aspect of the disclosure, there is provided a system for providing an interface for visual question answering, the system including: at least one memory storage configured to store computer executable and readable instructions; and at least one processor configured to execute the instructions stored in the at least one memory storage, wherein the at least one processor is configured to: receive 360-degree video data; acquire a plurality of images corresponding to a plurality of fields of view (FOV) based on the 360-degree video data; identify a plurality of objects included in the plurality of images and store metadata regarding the plurality of objects, the metadata including plane coordinates for each object of the plurality of objects; convert plane coordinates of each of the plurality of objects into respective spherical coordinates of a spherical coordinate system based on the metadata; classify the plurality of objects into a plurality of lists according to labels based on the metadata; select a first object having a highest correct answer probability from among a plurality of first objects included in a first list corresponding to a first label from among the plurality of lists; compare the spherical coordinates of the first object having the highest correct answer probability with the spherical coordinates of each of the remaining first objects of the plurality of first objects, and remove, based on a result of the comparison, a first object satisfying a preset condition among the remaining first objects from the plurality of images; and generate an interface for visual question answering, the interface being based on the plurality of images in which the first object satisfying the preset condition is removed.

The at least one processor may be configured to: select a second object having a highest correct answer probability from among a plurality of second objects included in a second list corresponding to a second label from among the plurality of lists; compare the spherical coordinates of the second object having the highest correct answer probability to the spherical coordinates of each of the remaining second objects of the plurality of objects, and remove, based on a result of the comparison, a second object satisfying a preset condition among the remaining second objects from the plurality of images; and wherein the interface for visual question answering is further based on the plurality of images in which the second object satisfying the preset condition is removed.

In a spherical coordinate system, the removed first object satisfying the preset condition overlaps the first object having the highest correct answer probability by an overlapping area amount that is greater than or equal to a threshold area.

The at least one processor may be configured to: arrange the plurality of first objects in a descending order based on a correct answer probability to thereby generate the first list; and select a first object arranged first in the first list as the first object having the highest correct answer probability.

The at least one processor may be configured to: adopt the first object having the highest correct answer probability as a correct answer for the first label and remove the first object having the highest correct answer from the first list; and remove the first object satisfying the preset condition from the first list.

The at least one processor may be configured to, until all of the plurality of first objects in the first list are removed, repeatedly perform: (a) a first operation of selecting the first object having the highest correct answer probability; (b) a second operation of adopting the first object having the highest correct answer probability as a correct answer for the first label, (c) removing the first object having the highest correct answer from the first list; and (d) a third operation of removing the first object satisfying the preset condition from the first list.

The at least one processor may be configured to process the plurality of images in which the first object satisfying the preset condition is removed, to thereby generate a panorama image in a specific viewpoint.

The at least one processor may be configured to, based on a discontinuous object being identified on at least one side of the panorama image, perform a correction for adding an image including at least a portion of the discontinuous object to the at least one side of the panorama image.

The at least one processor may be configured to perform a correction for adding an image corresponding to an upper view with respect to the specific viewpoint among the plurality of images to one side of the panorama image.

The at least one processor may be configured to perform a correction for adding an image corresponding to a lower view with respect to the specific viewpoint among the plurality of images to one side of the panorama image.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a diagram illustrating an example of a question answering system;

FIG. 7 illustrates an example of metadata of a plurality of images;

DETAILED DESCRIPTION

Figure 2:
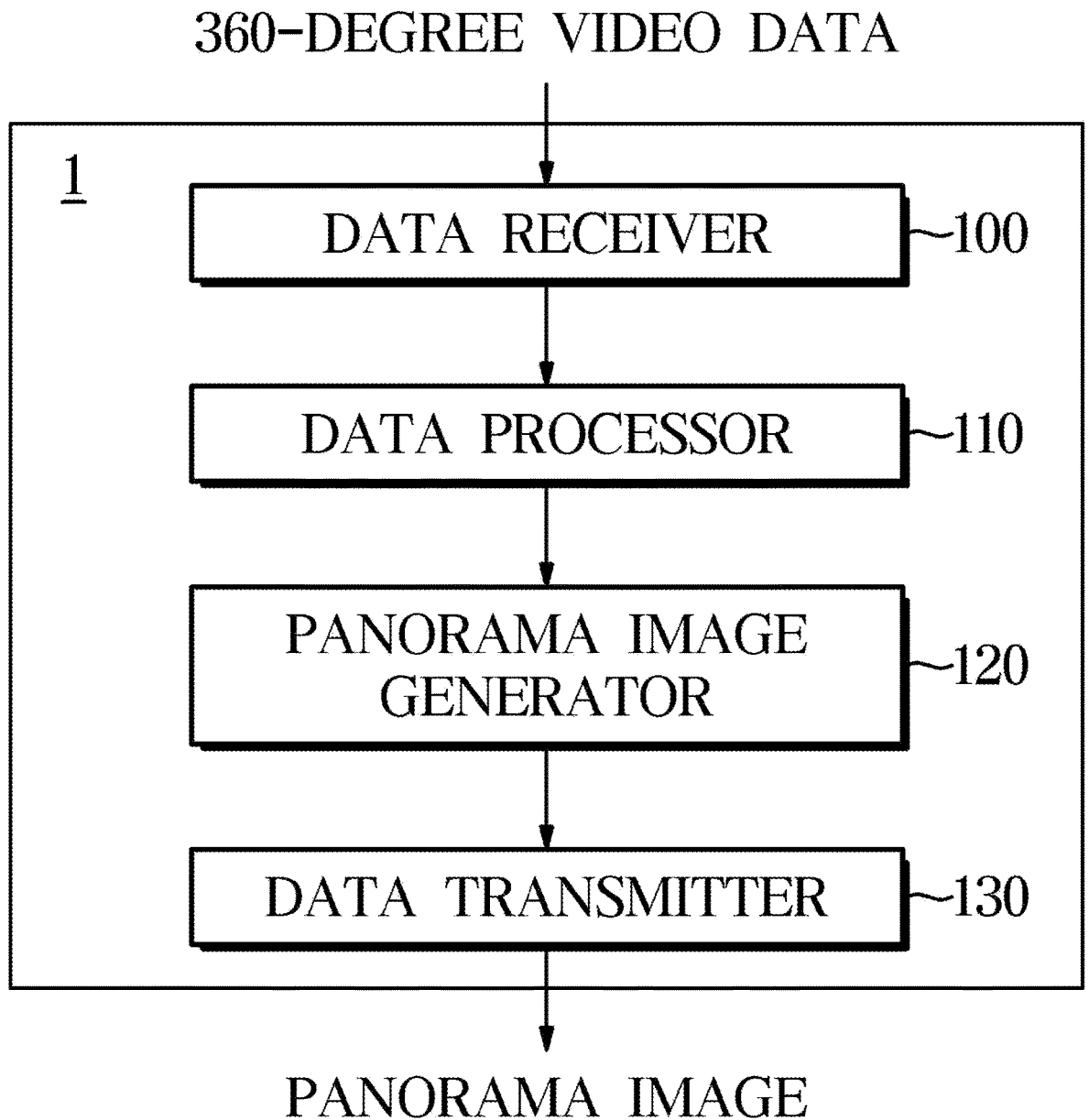
FIG. 2 is a block diagram illustrating a configuration of a system according to an embodiment.

Advantages and features of exemplary embodiments, and methods of achieving the same will be clearly understood with reference to the accompanying drawings and the following detailed exemplary embodiments. However, the present inventive concept is not limited to exemplary embodiments described herein, but may be implemented in various different forms. Exemplary embodiments are provided in order to explain the present inventive concept for those skilled in the art. The scope of the present inventive concept is defined by the appended claims.

The terms used herein will be briefly described and exemplary embodiments will be described in detail.

Although the terms used herein are selected from among general terms that are currently and widely used in consideration of functions in exemplary embodiments, these may be changed according to intentions or customs of those skilled in the art or the advent of new technology. In addition, in a specific case, some terms may be arbitrary selected by applicants. In this case, meanings thereof will be described in a corresponding description of exemplary embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that can be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Reference numerals used for method steps are just used for convenience of explanation, but not to limit an order of the steps. Thus, unless the context clearly dictates otherwise, the written order may be practiced otherwise.

Hereinafter, embodiments of a method and system for generating an interface for visual question answering will be described in detail with reference to the accompanying drawings. In addition, parts irrelevant to description are omitted in the drawings in order to clearly explain exemplary embodiments and the same reference numerals are used to designate the same elements through the whole specification and redundant descriptions thereof will be omitted.

FIG. 1 is a diagram illustrating an example of a question answering system.

Referring to FIG. 1, a system 1 for providing a visual interface for question answering (hereinafter referred to as a 'question answering system') may provide a visual interface for question answering (hereinafter referred to as a 'visual interface') to a user.

The visual interface may include a panorama image generated based on 360-degree video data and question details about the panorama image.

The question answering system 1 may process the input panorama image to identify an object included in the panorama image, make a mark (e.g., a circle) on the identified object, and generate a question asking what the marked object is.

An annotator may enter an answer to the question included in the visual interface, to train an AI model.

For example, when a rugby ball is included in the panorama image, the question answering system 1 may provide a visual interface in which a rugby ball region is marked and may provide a question asking what object is present within the marked region. The annotator may write an answer "rugby ball" in an answer item through an input device (e.g., a keyboard, a microphone, a mouse, etc.) to provide the question answering system 1 with the answer corresponding to the question.

The AI model may be trained based on questions about a panorama image and answers to the questions.

According to various embodiments, the question answering system 1 may generate various questions about the identified object.

In order for the annotator to accurately answer the question of the question answering system 1, there is a need to provide an image that is easily recognized by a human.

However, since a panorama image includes a spatial structure that is different from that usually perceived by a human, it is difficult for an annotator to recognize an object included in the panorama image due to distortion and/or discontinuity and/or noise objects.

FIG. 2 is a block diagram illustrating a configuration of a system according to an embodiment.

Referring to FIG. 2, the question answering system 1 according to the embodiment may include a data receiver 100, a data processor 110, a panorama image generator 120, and/or a data transmitter 130.

The data receiver 100 may receive 360-degree video data from an external device (e.g., a server and a user terminal) and/or a database.

The 360-degree video data may refer to data about video 360-degree and/or data about image content captured or reproduced in all directions (360-degrees).

The 360-degree video data may be acquired by one or more camera devices, or may be generated by developers who develop virtual reality (VR) content (e.g., VR games, VR movies).

In an embodiment, the data receiver 100 may include a communication module for receiving 360-degree video data from an external device.

As another example, the data receiver 100 may include a communication port for receiving 360-degree video data from the database of the question answering system 1.

However, the example of the data receiver 100 is not limited thereto, and may include any configuration capable of transmitting 360-degree video data to the data processor 110 without limitation.

The data processor 110 may process the 360 degree video data received from the data receiver 100.

For example, the data processor 110 may convert a format of the 360-degree video data. For example, the data processor 110 may convert the format of the 360-degree video data into an equirectangular format.

The data processor 110 may acquire a plurality of projection images from the 360-degree video data. For example, the data processor 110 may acquire a plurality of projection images from the 360-degree video data having an equirectangular format.

In addition, the data processor 110 may identify an object included in the plurality of projection images.

As an example, the data processor 110 may perform image pre-processing on the plurality of projection images, and the image pre-processing may include one or more processes of processing the plurality of projection images such that objects included in the plurality of projection images are provided with a more easily identifiable form.

For example, the image pre-processing process may include a process of removing noise included in the plurality of projection images, a process of increasing the contrast of the plurality of projection images, a blurring process of removing blur included in the plurality of projection images, a process of removing a background region, a warping process of correcting distortion included in the plurality of projection images, a process of binarizing the plurality of projection images, and the like.

The data processor 110 may detect objects from the plurality of projection images using, for example, a Haar-based cascade AdaBoost classifier, a neural network-based classifier, a support vector machine, and the like. However, the scope of the embodiment is not limited thereto, and the data processor 110 may detect objects from a plurality of projection images using various object detection techniques.

The data processor 110 may compare the image of the object identified from the plurality of projection images with reference object images stored in the database to extract a label of the identified object.

The data processor 110 may calculate a similarity score between the image of the identified object and the reference object images, set the label of the identified object as a label corresponding to an object having the highest similarity score, and store information about the similarity score for the set label.

That is, the data processor 110 may classify the category of the identified object based on the image of the identified object, compares the image of the identified object with a plurality of reference object images corresponding to the category, set the label of the identified object according to a result of the comparison, and calculate the correct answer probability, which refers to the reliability of the label.

For example, when an apple is included in the plurality of projection images, the data processor 110 may classify the category as a fruit based on an apple image included in the projection image, compare the apple image included in the projection images with a plurality of reference object images corresponding to fruits (e.g., a plurality of reference images including apples, pears, peaches, etc.) to set the label "Apple" for the apple image included in the projection images, and store information that the apple image included in the projection images corresponds to an "apple" with a probability of 80%.

The data processor 110 may adopt various algorithms to identify, classify, and label objects included in the plurality of projection images. For example, the data processor 110 may identify, classify, and label objects included in the plurality of projection images using a learning model trained by machine learning.

To this end, the data processor 110 may be implemented as an artificial intelligence processor and may be composed of a plurality of neural network layers, and each of the plurality of neural network layers may have a plurality of weights, and through computation between a previous layer calculation result and the plurality of weights, perform neural network computation.

The plurality of neural network layers may include a first layer for identifying a category of an object and/or a second layer for identifying a name of an object.

The plurality of neural networks may include a deep neural network (DNN), for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a deep Q-network, or the like, but is not limited thereto.

The data processor 110 may generate metadata about the identified object.

The metadata may include FOV information of a projection image in which the object is identified, plane coordinate information and/or spherical coordinate information of the object, label information of the object, and/or correct answer probability information of the object.

The FOV information of the projection image in which the object is identified may refer to information about an FOV from which the projection image where the object is identified is acquired from among the plurality of FOVs.

The plane coordinate information of the object may refer to at least one coordinate indicating a region occupied by the object in an equirectangular projection image. For example, the region occupied by an object in a projection image may be a rectangular region formed by connecting four planar coordinates.

For example, when the four plane coordinates are {P1(0, 0), P2(1,0), P3(0,1), P4(1,1)}, the region occupied by the object in the projection image may represent a region surrounded by a line segment P1P2, a line segment P1P3, a line segment P2P4, and a line segment P3P4.

The label information of the object may refer to information for distinguishing the identified object from other objects. For example, the label information of the object may include information about the name of the identified object, but is not limited thereto. For example, the label information of the object may include information about a category (e.g., fruit, animal) of the identified object.

The correct answer probability information of the object may include information about a probability that the object is set to the corresponding label is correct.

As such, the data processor 110 may identify a plurality of objects included in the plurality of projection images and store metadata regarding each of the plurality of objects.

As will be described below, the data processor 110 may identify a noise object from among a plurality of objects included in the plurality of projection images based on the metadata of the plurality of projection images, and generate a plurality of projection images in which the noise object is removed.

The panorama image generator 120 may generate a panorama image corresponding to a plurality of preset viewports based on the plurality of projection images received from the data processor 110.

The panorama image may include a panoramic video based on 360-degree video data, or may refer to at least one frame image of panoramic video.

For example, the panorama image generator 120 may synthesize some of the plurality of projection images based on the FOV of each of the plurality of projection images.

As described above, the panorama image generator 120 may select at least one corresponding projection image according to a selected viewport from among a plurality of projection images, and synthesizes the selected at least one projection image to generate a panorama image corresponding to the selected viewport.

As will be described below, for the convenience of the annotator, the panorama image generator 120 may perform image correction for resolving discontinuity in the panorama image, and may perform image correction for adding an image that provides additional information about the panorama image.

The panorama image generated by the panorama image generator 120 may be used as an interface for visual question answering. The question answering system 1 may generate a question about the panorama image generated by the panorama image generator 120, and provide a user with a visual interface for question answering including the panorama image and question items.

The data transmitter 130 may transmit the panorama image generated by the panorama image generator 120 to an external device or may transmit the panorama image to a display system of the question answering system 1.

When the question answering system 1 includes a display system itself, the data transmitter 130 may transmit the panorama image to the display system through wired communication.

The display system may convert the panorama image into a form that is allowed to be output to the display, and control the display to display a visual interface including question items about the panorama image.

The configuration of the question answering system 1 (e.g., the data receiver 100, the data processor 110, the panorama image generator 120, and/or the data transmitter 130) may be implemented using at least one memory in which a program for performing the above-described operations and operations to be described below and various data required for executing the program are stored and at least one processor executing the stored program.

For example, the at least one processor may be a general-purpose processor, such as a central processing unit (CPU), an application processor (AP), a digital signal processor (DSP), or the like, a graphics-only processor, such as a graphics processing unit (GPU), a vision Processor (VPU), or an artificial intelligence-only processor, such as an neural processing unit (NPU).

When the memory and processor included in the question answering system 1 are provided in plural, the plurality of memories and processors may be integrated on one chip or may be physically separated.

Figure 3:
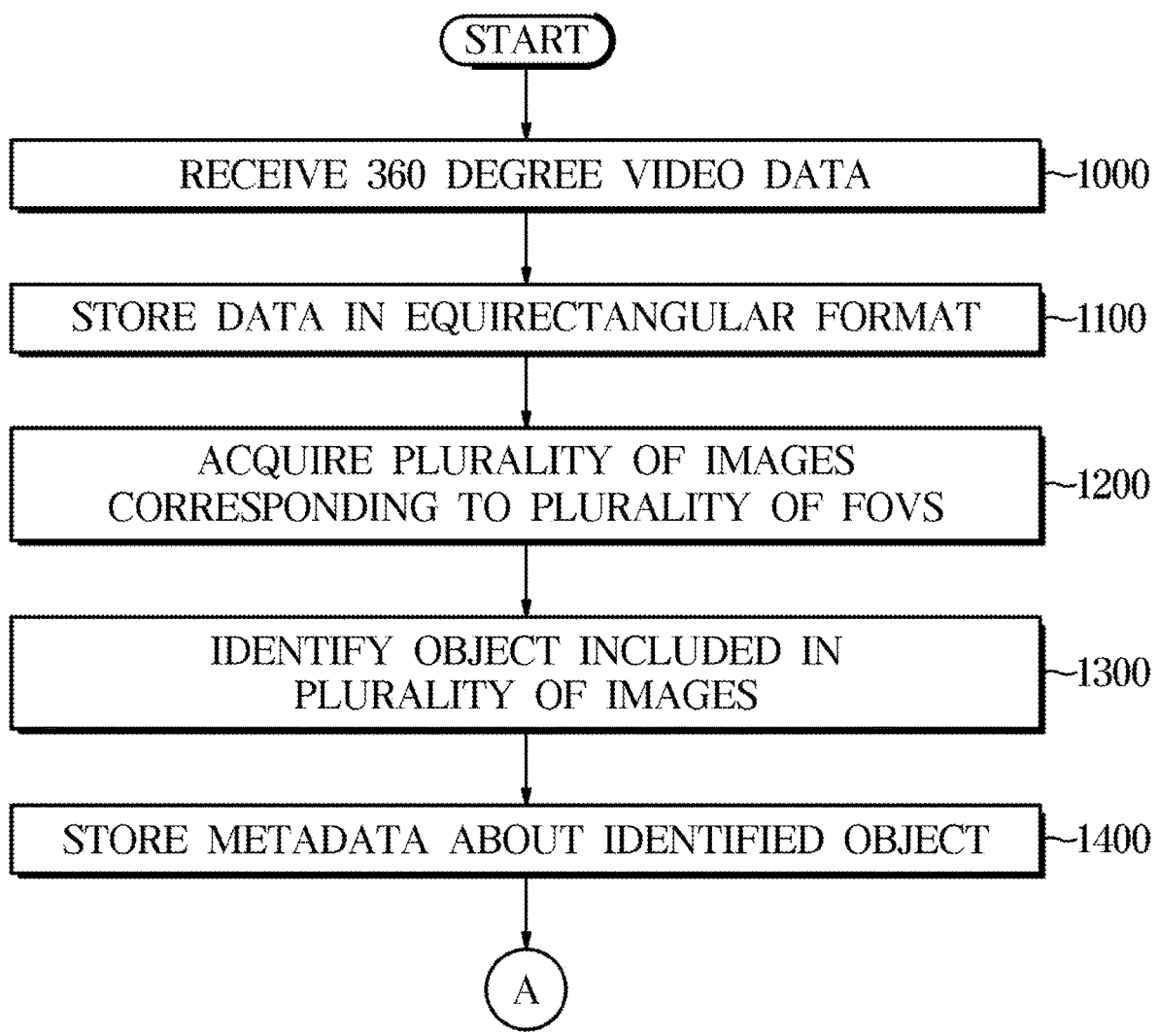
FIG. 3 is a flowchart illustrating a method for a system to acquire an image according to an embodiment.

FIG. 3 is a flowchart illustrating a method for a system to acquire an image according to an embodiment.

Referring to FIG. 3, the question answering system 1 may receive 360-degree video data. For example, the data receiver 100 may receive 360-degree video data from an external device (e.g., a server, a user terminal) and/or a database (1000).

The data processor 110 may convert the format of the 360-degree video data into an equirectangular format. The memory of the question answering system 1 may store the 360-degree video data that has been converted to have an equirectangular format (1100).

Figure 4:
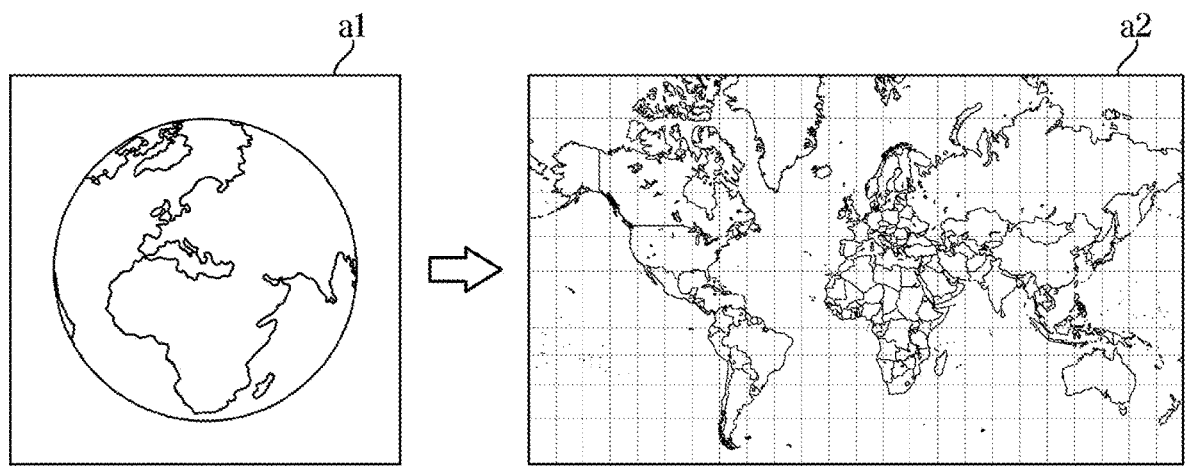
FIG. 4 is a diagram for describing an equirectangular format of 360-degree video data.

FIG. 4 is a diagram for describing an equirectangular format of 360-degree video data.

Referring to FIG. 4, 360-degree video data a1 may refer to data about video and/or data about image content captured or reproduced in all directions (360-degrees).

The 360-degree video data a1 may be expressed in a spherical coordinate system, and may include pixel data values corresponding to specific spherical coordinates. The spherical coordinate system is a coordinate system that expresses the position of a point P using a radius r of a sphere centered at the origin and passing through the point P, an angle $\theta$ formed between a half line passing through the origin and the point P and the z axis, and an angle $\phi$ formed between a plane including the z axis and the point P and the xz plane.

For example, the 360-degree video data a1 may include pixel data about a plurality of points $P_n$ $(r_n, \theta_n, \phi_n)$.

The 360-degree video data a1 may be expressed in a form projected on a plane by an equirectangular method, which is a method of transferring virtual coordinates of the 360-degree video data on a plane.

The 360-degree video data a1 may be converted into data a2 of an equirectangular format according to a known technique.

The data a2 of the equirectangular format may be expressed in a planar coordinate system, unlike the 360-degree video data a1.

The coordinate plane of the planar coordinate system may define an x-axis (horizontal direction) and a y-axis (vertical direction) that are orthogonal to each other while forming an xy plane, and define a point at which the x-axis and the y-axis meet as the origin. The planar coordinate system is a coordinate system for expressing the position of a point P using a point x on the x-axis in which the x-axis and a vertical line passing through the point P meet, and a point y on the y-axis in which the y-axis and a horizontal line passing through the point P meet.

For example, the data a2 of the equirectangular format may include pixel data about a plurality of points $P_n$ $(x_n, y_n)$.

One point $P_1(r_1, \theta_1, \phi_1)$ of the 360 degree video data a1 may correspond to one point $P_1(x_1, y_1)$ of the data a2 of the equirectangular format. However, since the spatial structures are different from each other, a one-to-one correspondence between a point in the spherical coordinate system and a point in the planar coordinate system may not be established.

The question answering system 1 may acquire a plurality of images corresponding to a plurality of field of views based on the 360-degree video data a1 (1200).

The plurality of field of views may be set in advance to include all regions on the sphere, and may overlap each other in order to reduce distortion.

For example, the data processor 110 may acquire projection images based on a plurality of preset FOVs from 360-degree video data.

Figure 5:
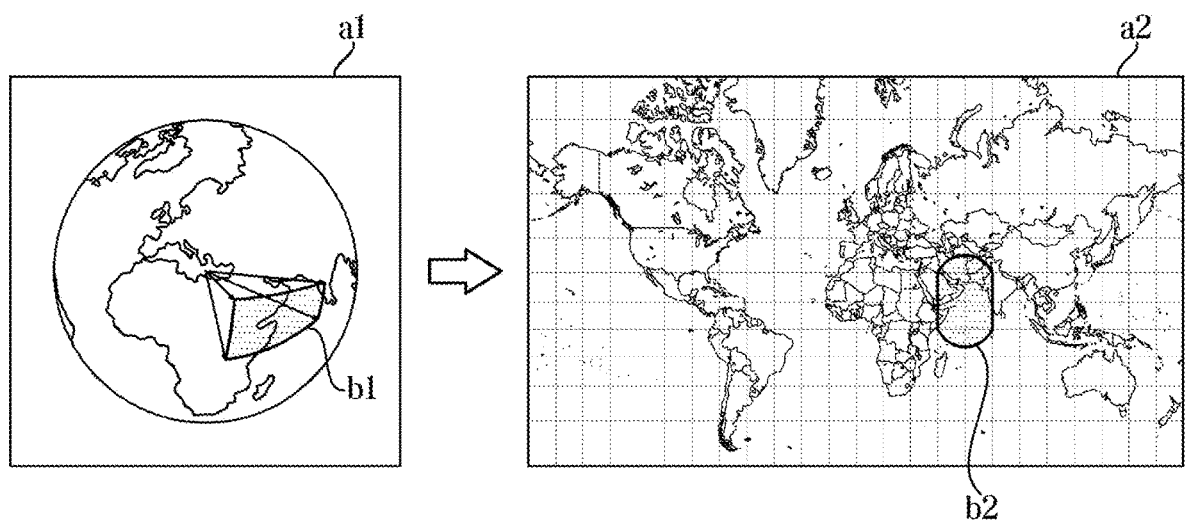
FIG. 5 is a view for describing an image of a 360-degree video projected in a specific field of view (FOV)

FIG. 5 is a view for describing an image of a 360-degree video projected in a specific field of view (FOV).

Referring to FIG. 5, a field of view for the 360-degree video data a1 may include a region b1 surrounded by four points on the spherical coordinate system.

A field of view of view for the data a2 of the equirectangular format may include a region b2 surrounded by four points on the planar coordinate system.

For example, when a first field of view for the 360-degree video data a1 includes a region b1 surrounded by four points $\{P_1(r_1, \theta_1, \phi_1), P_2(r_2, \theta_2, \phi_2), P_3(r_3, \theta_3, \phi_3), $ and $P_4(r_4, \theta_4, \phi_4)\}$ on the spherical coordinate system, a first field of view for the data a2 in the equirectangular format may include a region b2 surrounded by four points $\{P_1(x_1,y_1), P_2(x_2,y_2), P_3(x_3,y_3), $ and $P_4(x_4,y_4)\}$.

The plurality of images corresponding to the plurality of field of views may include portions that overlap each other.

The question answering system 1 may identify an object included in the plurality of images corresponding to the plurality of field of views (1300).

As described above, the data processor 110 may identify the object from the plurality of images using various object detection techniques.

For example, the data processor 110 may process each of the plurality of images using a Haar-based cascade Ada-Boost classifier, a neural network-based classifier, or a support vector machine to detect an object included in each of the plurality of images.

The question answering system 1 may store metadata about the identified object (1400).

For example, the data processor 110 may generate metadata about the identified object.

The metadata may include FOV information of a projection image in which the object is identified, plane coordinate and/or spherical coordinate information of the object, label information of the object, and/or correct answer probability information of the object.

In this case, the plane coordinate information of the plurality of objects may include coordinate values for at least three points for forming a region surrounding the identified object.

For example, the metadata may include FOV information of a projection image in which a first object detected from one of the plurality of images is identified, planar coordinate and/or spherical coordinate information of the first object, label information of the first object, and/or the correct answer probability information of the first object.

In addition, the metadata may include FOV information of a projection image in which an $n^{th}$ object (n is a natural number) detected from one of the plurality of images is identified, planar coordinates and/or spherical coordinate information of the $n^{th}$ object, label information of the $n^{th}$ object, and/or the correct answer probability information of the $n^{th}$ object.

To summarize, in one embodiment, the question answering system 1 may receive 360-degree video data, project the 360-degree video data based on a plurality of field of views to acquire a plurality of images, identify an object included in the plurality of images, and store metadata about the identified object.

Figure 6:
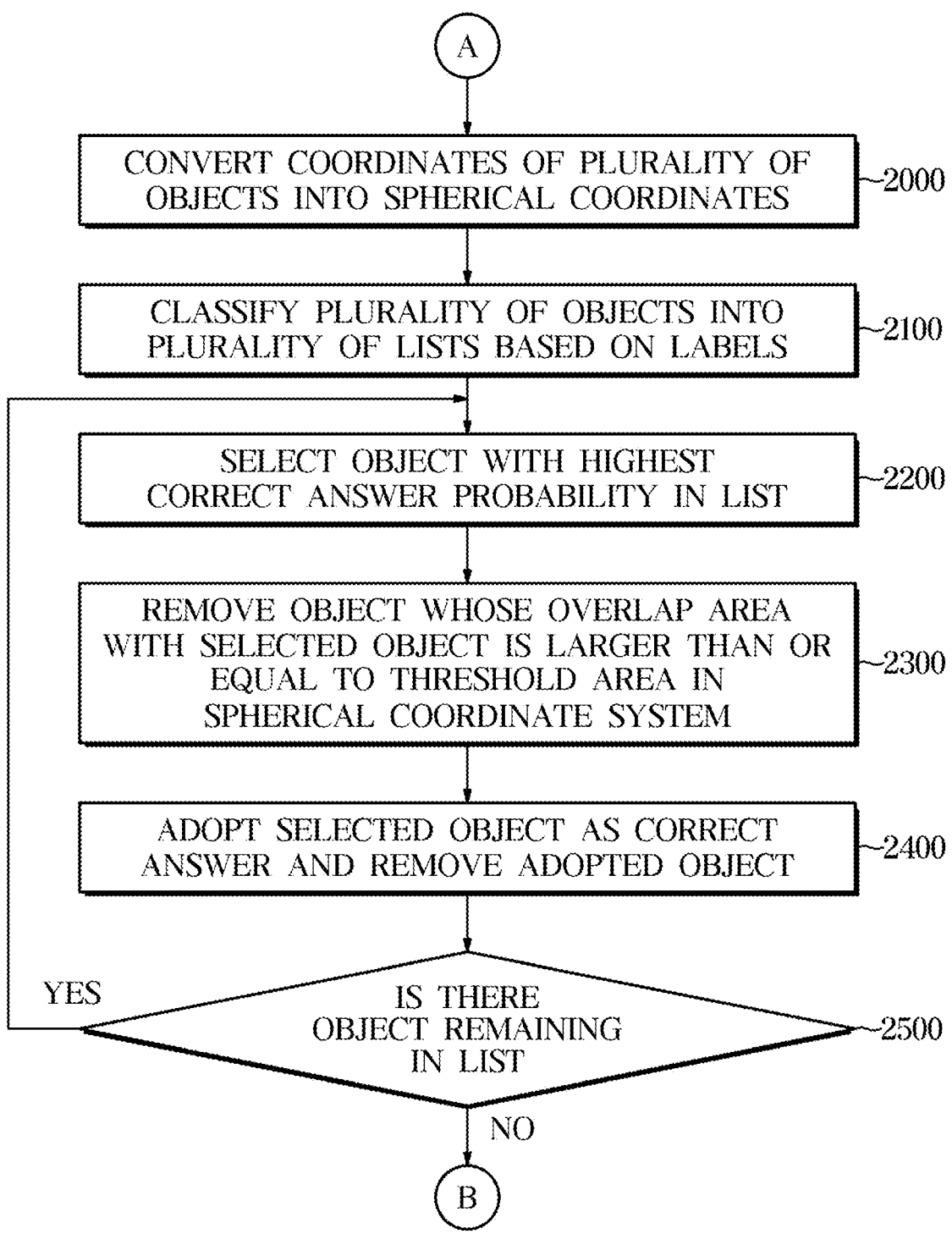
FIG. 6 is a flowchart showing a method for a system to remove a noise object from a plurality of images according to an embodiment.

FIG. 6 is a flowchart showing a method for a system to remove a noise object from a plurality of images according to an embodiment.

Referring to FIG. 6, the question answering system 1 may convert coordinates of a plurality of objects into spherical coordinates based on planar coordinate information of the plurality of objects (2000).

The coordinates of an object may include at least three coordinate values for defining a region surrounding the object (hereinafter, 'region of object').

In an embodiment, the data processor 110 may convert plane coordinates, with which an object is identified in each of the plurality of, images into spherical coordinates in the spherical coordinate system.

The question answering system 1 may classify the plurality of objects into a plurality of lists based on the label information (2100).

To this end, the data processor 110 may classify a plurality of objects according to labels. For example, the data processor 110 may classify a plurality of first objects distinguished as a first label (e.g., a rugby ball) among a plurality of objects into a first list, and classify a plurality of second objects distinguished as a second label (e.g., a chair) among the plurality of objects into a second list.

According to various embodiments, the data processor 110 may generate the first list by arranging the plurality of first objects in a descending order based on the correct answer probabilities.

For example, the data processor 110 may arrange a first object with the highest probability of corresponding to the first label among the plurality of first objects distinguished as the first label on the first order, and arrange the plurality of first objects in the order of the highest probability of corresponding to the first label.

According to various embodiments, the data processor 110 may generate an $n^{th}$ list by arranging a plurality of $n^{th}$ objects distinguished as a $n^{th}$ label (n is a natural number) in a descending order based on the correct answer probabilities.

For example, the data processor 110 may arrange an $n^{th}$ object with the highest probability of corresponding to the $n^{th}$ label among a plurality of $n^{th}$ objects distinguished as the $n^{th}$ label on the first order, and arrange the plurality of $n^{th}$ objects in the order of the highest probability of corresponding to the nth label.

FIG. 7 illustrates an example of metadata of a plurality of images.

Referring to FIG. 7, metadata processed and classified by the question answering system 1 may be identified.

Information about a plurality of objects extracted from a plurality of images P1, P2, P3$_7$ . . . and Pm may be classified according to labels.

A plurality of first objects classified into the first list corresponding to a first label (e.g., an apple) may have the correct answer probabilities of $\{0.84, 0.75, 0.3, \ldots$ and so on$\}$, respectively. Each of the plurality of first objects classified as the first label may match with spherical coordinate information for defining a region of the corresponding first object.

For example, the region of the first object having the highest correct answer probability in the first list may be defined by coordinate values for at least three points $\{P(r_{11a}, \theta_{11a}, \phi_{11a}), P(r_{12a}, \theta_{12a}, \phi_{12a}), P(r_{13a}, \theta_{13a}, \phi_{13a}), P(r_{14a}, \theta_{14a}, \phi_{14a})\}$.

As another example, the region of the first object having the second highest correct answer probability in the first list may be defined by coordinate values of at least three points $\{P(r_{11b}, \theta_{11b}, \phi_{11b}), P(r_{12b}, \theta_{12b}, \phi_{12b}), P(r_{13b}, \theta_{13b}, \phi_{13a}), P(r_{14b}, \theta_{14b}, \phi_{14b})\}$.

A plurality of second objects classified into the second list corresponding to a second label (e.g., a rugby ball) may have the correct answer probabilities of $\{0.76, 0.4, 0.2, \ldots,$ and so on$\}$. Each of the plurality of second objects classified as the second label may match with spherical coordinate information defining a region of the corresponding second object.

For example, the region of the second object having the highest correct answer probability in the second list may be defined by coordinate values for at least three points $\{P(r_{21a}, \theta_{21a}, \phi_{21a}), P(r_{22a}, \theta_{22a}, \phi_{22a}), P(r_{23a}, \theta_{23a}, \phi_{23a}), P(r_{14a}, \theta_{24a}, \phi_{24a})\}$.

As another example, the region of the second object having the second highest correct answer probability in the second list may be defined by coordinate values of at least three points $\{P(r_{21b}, \theta_{21b}, \phi_{21b}), P(r_{22b}, \theta_{22b}, \phi_{22b}), P(r_{23b}, \theta_{23b}, \phi_{23b}), P(r_{14b}, \theta_{24b}, \phi_{24b})\}$.

As described above, the data processor 110 may classify a plurality of objects into a plurality of lists based on the label, and arrange information about the plurality of objects in the descending order in each list according to the correct answer probabilities.

The question answering system 1 may select an object having the highest correct answer probability, for each of the plurality of lists (2200).

For example, the data processor 110 may select a first object having the highest correct answer probability from among a plurality of first objects included in a first list corresponding to a first label among a plurality of lists.

According to various embodiments, since an object having the highest correct answer probability is arranged on the forefront in each list, the data processor 110 may select an object arranged on the first order in each list so that an object with the highest correct answer probability among a plurality of objects included in each list may be selected.

For example, the data processor 110 may select a first object arranged on the first order in the first list so that a first object with the highest correct answer probability may be selected in the first list.

The question answering system 1 may compare the object having the highest correct answer probability with the remaining objects in each list, and based on a result of the comparison, may remove an object satisfying a preset condition from each list.

In various embodiments, the question answering system 1 may remove an object whose region overlaps the region of the object having the highest correct answer probability with an overlap larger than or equal to a threshold value, from each list in the spherical coordinate system (2300).

For example, the data processor 110 may select a first object with the highest correct answer probability (hereinafter, 'first correct object') from the first list, and compare the first correct object with the remaining first objects included in the first list.

Specifically, the data processor 110 may compare the region of the first correct answer object with the regions of the remaining first objects in the spherical coordinate system.

The data processor 110 may remove a first object whose region overlaps the region of the first correct answer object with an overlap larger than or equal to the threshold value from the first list.

Figure 8:
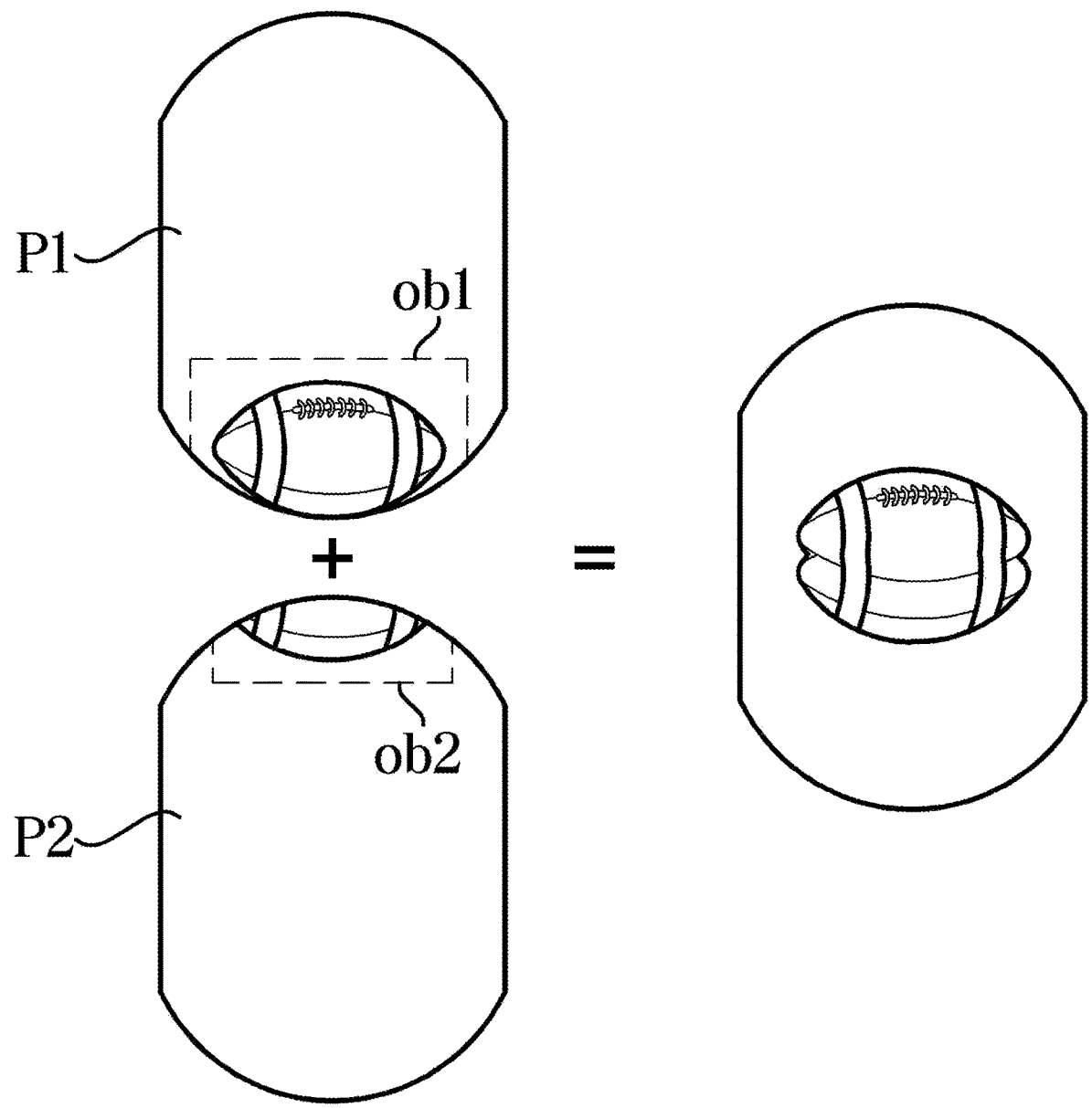
FIG. 8 illustrates a portion of a panorama image generated based on a plurality of images including a noise object.

For example, in the spherical coordinate system, the removed first object overlaps the first object having the highest correct answer probability (e.g., the first correct object) by an overlapping area amount that is greater than or equal to a threshold area. In this way, if a first object of the plurality of first objects is distorted because it overlaps on top of the correct first object that overlapping and/or distorted first object may be removed if the extent of the area in which the objects are overlapping one another is greater than or equal to a preset threshold area. In at least one embodiment, a "threshold area" may refer to an extent of overlapping in which a distorted image is rendered in the spherical coordinate system, e.g, the rugby ball shown in FIG. 1 is distorted in that it appears to show a first and second rugby ball transposed on top of one another. It shall be appreciated that the "threshold area" may be different for different objects and that the "threshold area" may be user customizable depending on the degree of accuracy required and/or the amount of computing power practically capable of being utilized for this purpose. With reference back to FIG. 9, it is shown that the ob2 area (distorted first object/rugby ball) is removed because it overlaps with the ob1 area (a correct first object/rugby ball) because the extent with which the two objects (first non-distorted rugby ball and second distorted rugby ball) overlap one another is greater than a predetermined threshold area. In this way, only the correct first object is displayed such that an interface for visual question answering may include not distorted images. Conversely, as shown in FIG. 8, if the ob2 object were not removed the result would be a distorted image. Furthermore, it is noted that some level of overlapping may be permissible when the extent of such overlapping is less than the threshold area because such overlapping may be minimal and/or such overlapping may not adversely impact the visual question answering process.

Specifically, the data processor 110 may compare the spherical coordinates defining the region of the first correct answer object with the spherical coordinates defining the regions of each of the remaining first objects, and based on a result of the comparison, remove a first object satisfying a preset condition among the remaining first objects from the plurality of images.

In an embodiment, the data processor 110 may remove the first object whose region overlaps the region of the first correct object with an overlap larger than or equal to a threshold value from the plurality of images.

That is, in the spherical coordinate system, the area of an overlap between the region of the first correct answer object and the region of the first object satisfying the preset condition may be larger than or equal to the threshold value.

According to various embodiments, the threshold value may be set in proportion to the size of the region of the first correct answer object, or may be set irrespective of the size of the region of the first correct answer object. For example, the threshold value may be set as a preset ratio value with respect to the size of the region of the first correct answer object, or may be set as a specific area value independent of the size of the region of the first correct answer object.

When a first object has a large overlap with respect to a first correct object having the highest correct answer probability and has a lower correct answer probability than that of the first correct object, it means that the first object is incorrectly detected in a process of acquiring a plurality of images.

According to the present disclosure, the noise object that is inaccurately detected in the process of processing the plurality of images for generating the panorama image may be removed.

The question answering system 1 may adopt an object having the highest correct answer probability in each list as the correct answer, and then remove the object from the corresponding list (2400).

For example, the data processor 110 may adopt a first correct answer object as the correct answer, and remove the first correct answer object from the first list.

As the data processor 110 removes the first correct answer object from the first list, a first object having the highest correct answer probability without satisfying the preset condition related to the first correct answer object is caused to be arranged on the forefront of the first list.

The question answering system 1 may perform operations 2200, 2300, and 2400 again when there is an object remaining in each list (YES in operation 2500). That is, the question answering system 1 may repeatedly perform operations 2200, 2300, and 2400 until there is no object remaining in each list.

For example, the data processor 110 may select a first object (hereinafter, a '1-1 correct answer object') caused to be arranged on the forefront of the first list as the first correct answer object is removed from the first list (2200), and remove a first object whose region overlaps the region of the 1-1 correct answer object with an overlap larger than or equal to a threshold value, from the first list and the plurality of images (2300), and adopt the 1-1 correct answer object as a correct answer and then remove the 1-1 correct answer object from the first list (2400).

By repeating operations 2200, 2300, and 2400 until there is no object remaining in each of the plurality of lists, at least one correct answer corresponding to each label may be adopted and noise objects corresponding to each label may be removed.

Figure 9:
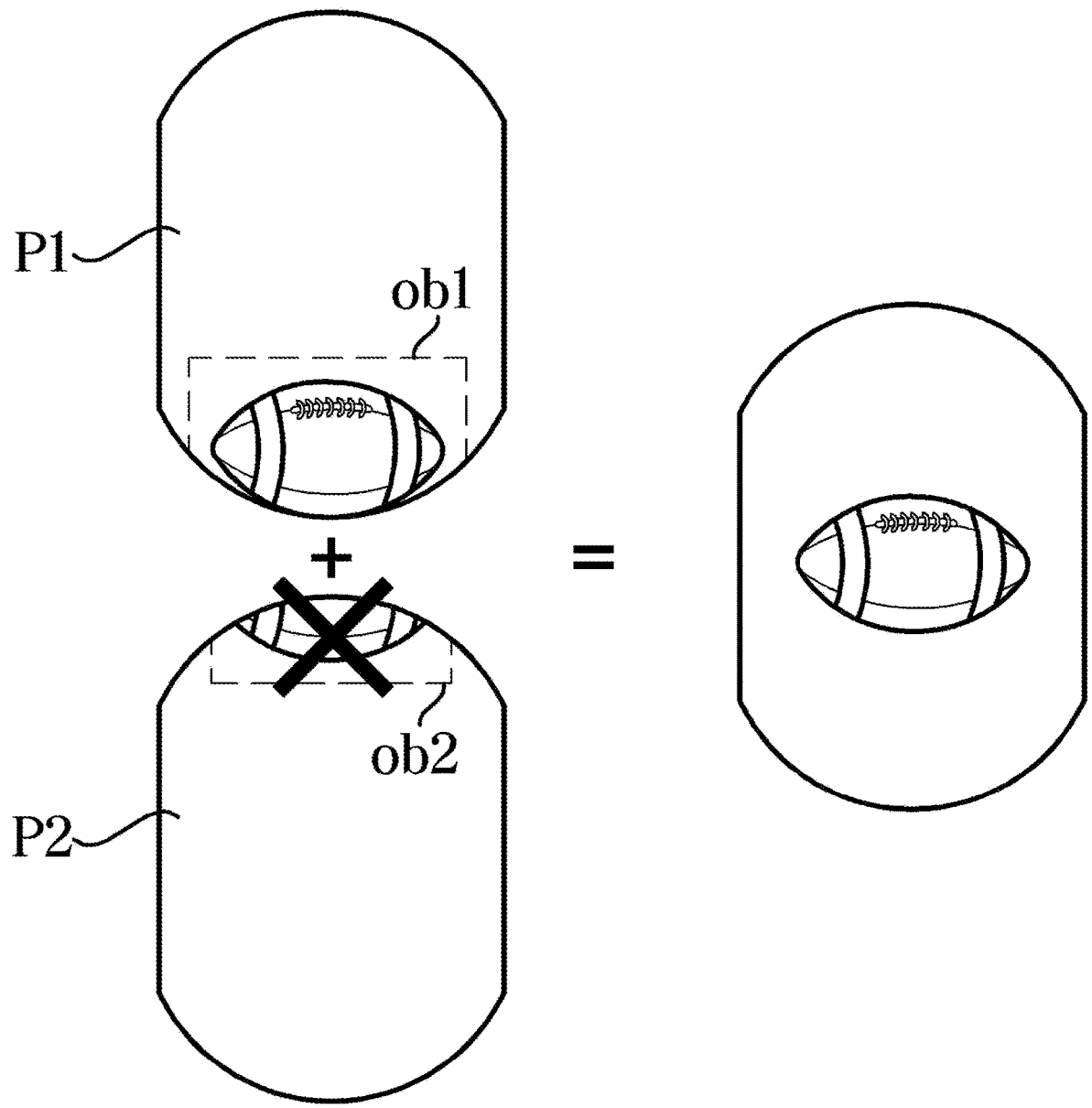
FIG. 9 illustrates a portion of a panorama image generated based on a plurality of images in which a noise object is removed.

FIG. 8 illustrates a portion of a panorama image generated based on a plurality of images including a noise object. FIG. 9 illustrates a portion of a panorama image generated based on a plurality of images in which a noise object is removed.

Referring to FIGS. 8 and 9, based on a plurality of images P1 and P2 being processed, a plurality of first objects ob1 and ob2 classified as a first label (e.g., a rugby ball) may be identified.

Assuming that the first object ob1 included in the first image P1 among the plurality of first objects has a higher correct answer probability than the first object ob2 included in the second image P2, the data processor 110 may identify the first object ob1 included in the first image P1 as the correct answer object.

The data processor 110 may, based on an overlap of the first correct object ob1 and the remaining first object ob2 being larger than or equal to a threshold value, remove the remaining first object ob2 from the second image P2.

As shown in FIG. 8, when the remaining first object ob2 is not removed, and panorama image the first image P1 and the second image P2 are synthesized to form a panorama image, a target corresponding to the first object may be distorted and appear as if stretched.

On the other hand, as shown in FIG. 9, when the remaining first object ob2 is removed, and panorama image the first image P1 and the second image P2 are synthesized to form a panorama image, it can be seen that the distortion of the target corresponding to the first object is reduced.

According to the present disclosure, panorama image by removing a noise object, distortion of each object included in a panorama image may be reduced.

For the sake of convenience of description, the above description has been made in relation to a method of removing first objects included in a first list, but when a plurality of lists are generated according to a plurality of labels, $n^{th}$ objects included in the $n^{th}$ list (n is a natural number) may also be subject to above-described method.

Figure 10:
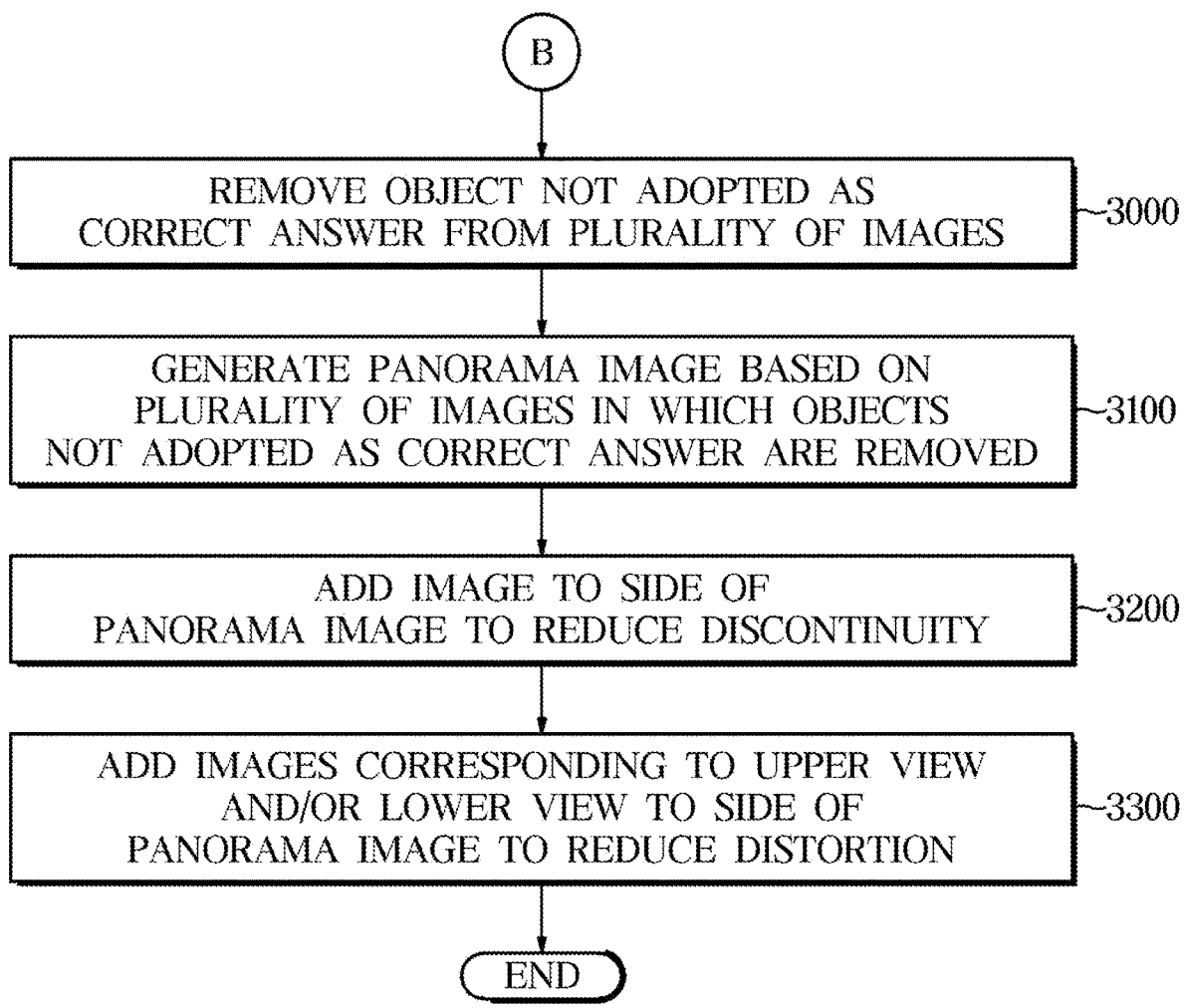
FIG. 10 is a flowchart showing a method for a system to provide an interface for visual question answering based on a plurality of images in which a noise object is removed, according to an embodiment.

FIG. 10 is a flowchart showing a method for a system to provide an interface for visual question answering based on a plurality of images in which a noise object is removed, according to an embodiment.

Referring to FIG. 10, the question answering system 1 may remove an object that is not adopted as the correct answer from a plurality of images (3000).

For example, the data processor 110 may remove the remaining objects from the plurality of images except for objects adopted as the correct answer in each of the plurality of lists.

The question answering system 1 may generate a panorama image based on the plurality of images in which the objects not adopted as the correct answer are removed (3100).

For example, the panorama image generator may panorama image synthesize the plurality of images, which are subjected to pre-processing, to generate a panorama image.

Specifically, the panorama image generator may process the plurality of images to generate a panorama image of a specific viewport.

The viewport may be recommended by a service provider, may be selected by an annotator, or may be arbitrarily selected.

The viewport may refer to a region of a 360-degree video that is being viewed by the annotator. The size and/or shape occupied by the region viewed by the annotator in the 360-degree video may be set in advance by the service provider.

According to the present disclosure, a panorama image may be generated based on a plurality of images in which a noise object is removed, thereby allowing an annotator to answer a question based on the panorama image with reduced distortion.

Figure 11:
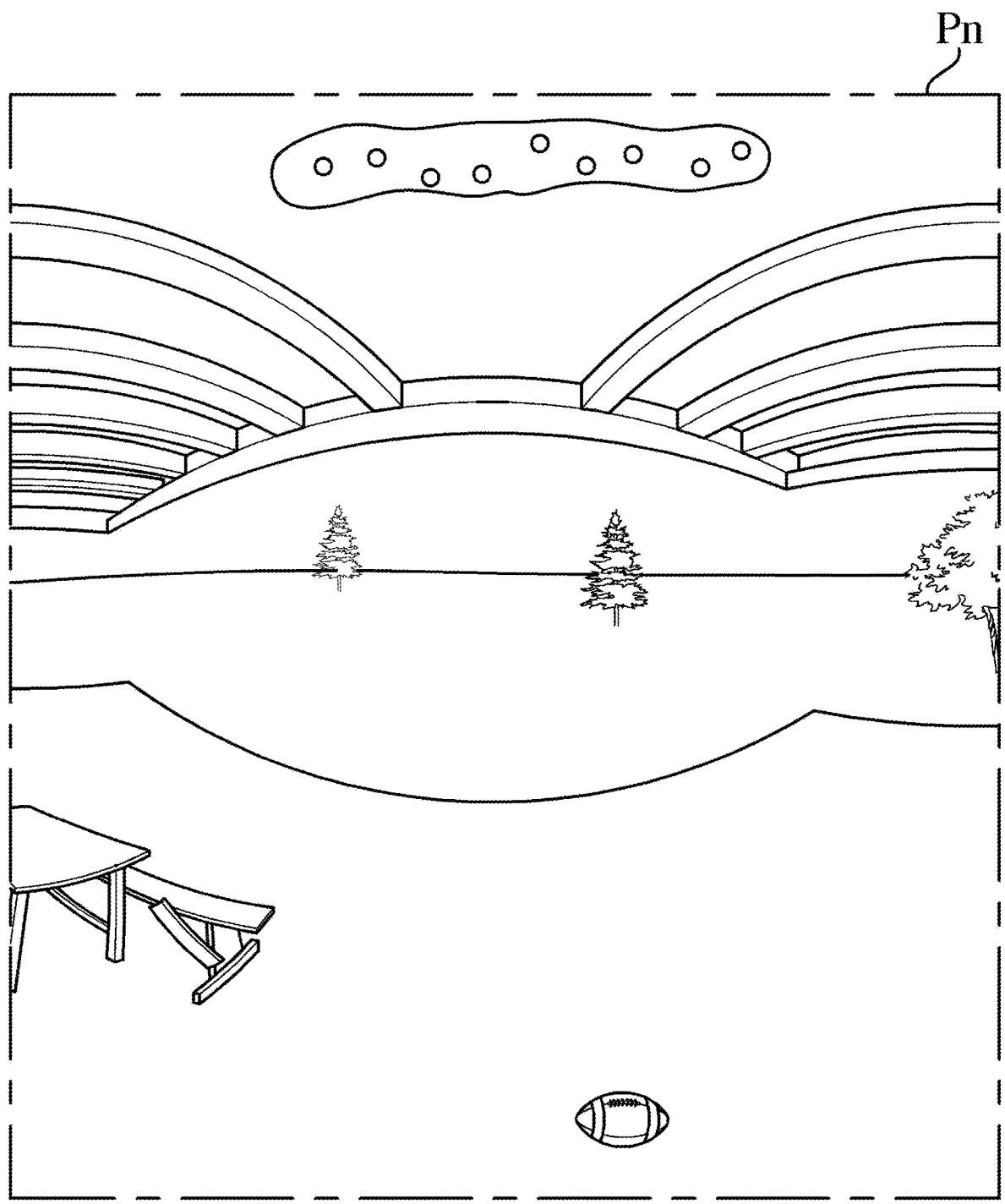
FIG. 11 illustrates an example of an interface including a panorama image in which a noise object is removed.

FIG. 11 illustrates an example of an interface including a panorama image in which a noise object is removed.

Referring to FIG. 11, a panorama image Pn in which a noise object is removed is shown.

In comparison to FIG. 1, it can be seen that an object with severe distortion on the panorama image is made to have less distortion.

In other words, the question answering system 1 may provide the annotator with the panorama image Pn in which the objects appear less stretched or overlapping.

Accordingly, the annotator may easily recognize the panorama image and smoothly answer the questions related to the panorama image.

Referring again to FIG. 10, according to various embodiments, the question answering system 1 may add a predetermined image to a side of the panorama image to reduce discontinuity of the panorama image (3200).

For example, the data processor 110 and/or the panorama image generator 120 may identify the discontinuity of an object located on at least one side of the panorama image.

For example, the data processor 110 and/or the panorama image generator 120 may calculate a label and a correct answer probability of an object located on at least one side of the panorama image based on the panorama image, and based on the correct answer probability being lower than a predetermined probability, identify that the object located on the at least one side of the panorama image is discontinuous.

The data processor 110 and/or the panorama image generator 120 may, based on the discontinuous object being identified on the at least one side of the panorama image, perform a correction for adding an image including at least a portion of the discontinuous object to the at least one side of the panorama image.

Figure 12:
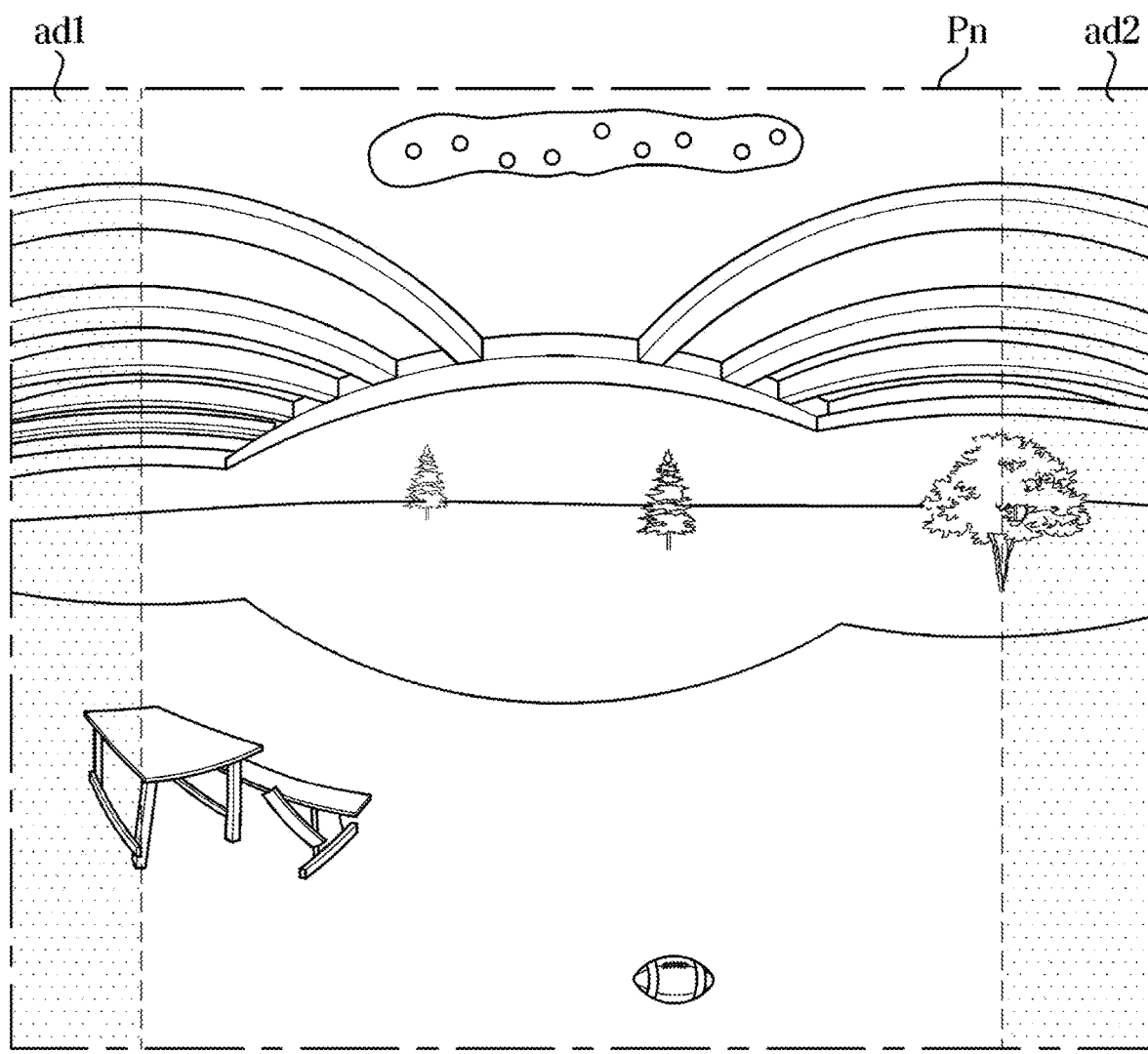
FIG. 12 illustrates an example of an interface including a panorama image in which discontinuity is reduced.

FIG. 12 illustrates an example of an interface including a panorama image in which discontinuity is reduced.

Referring to FIG. 12, it can be seen that predetermined images ad1 and ad2 are added to both sides of a panorama image Pn generated based on a specific viewport.

In the example of FIG. 12, the data processor 110 and/or the panorama image generator 120 may, based on a result of processing the panorama image Pn generated based on a specific viewport, determine whether there is a discontinuous object on one side (the left, right, upper and/or lower side) of the panorama image Pn.

For example, the data processor 110 and/or the panorama image generator 120 may determine whether an object having a correct answer probability lower than a preset probability is present on one side of the panorama image Pn.

The data processor 110 and/or the panorama image generator 120 may be based on an object having a correct answer probability lower than the preset probability being present on the one side of the panorama image Pn, add a predetermined image ad1 or ad2 to the one side of the panorama image Pn to provide the correct answer probability higher than the preset probability.

According to the present disclosure, the annotator may be prevented from having a difficulty in answering questions due to the discontinuity of the panorama image.

Figure 13:
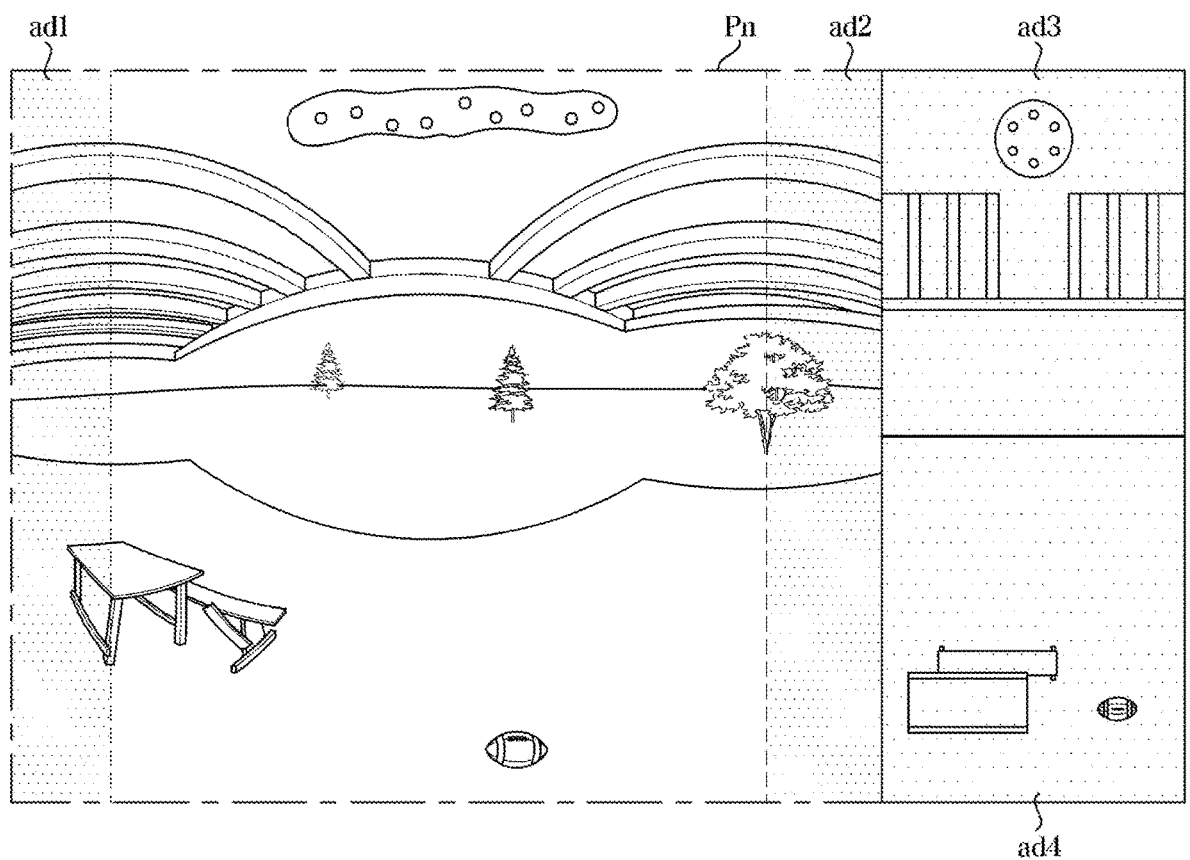
FIG. 13 illustrates an example of an interface with an additional image added for a severe distortion region of a panorama image.

Referring to FIG. 13, according to various embodiments, the question answering system 1 may add images ad3 and ad4 corresponding to a upper view and/or a lower view to a side of a panorama image to reduce distortion of the panorama image (3300).

In general, in a panorama image, distortion occurs more in the upper region and/or lower region than in the central region.

Accordingly, the annotator may have a difficulty in accurately recognizing objects present in the upper and lower regions of the panorama image.

In one embodiment, the question answering system 1 may perform a correction for adding images ad3 and ad4 corresponding to a upper view and/or a lower view with respect to a specific viewport, based on which the panorama image has been generated, among a plurality of images to one side of the panorama image.

For example, the data processor 110 and/or the panorama image generator 120 may, based on information about a viewport that has been used to acquire a panorama image Pn, select images ad3 and ad4 corresponding to an upper view and/or a lower view among a plurality of images forming the panorama image Pn.

That is, the images corresponding to the upper view and/or lower view with respect to the specific viewport may include a projection image ad3 having a field of view corresponding to the upper view with respect to a specific viewpoint and/or a projection image ad4 having a field of view corresponding to the lower view with respect to a specific viewpoint.

The data processor 110 and/or the panorama image generator 120 may perform a correction of adding the images ad3 and ad4 corresponding to the upper view and/or the lower view among the plurality of images forming the panorama image Pn to one side of the panorama image Pn.

FIG. 13 illustrates an example of an interface with an additional image added for a severe distortion region of a panorama image.

Referring to FIG. 13, it can be seen that, with respect to a panorama image Pn generated based on a specific viewport, an image ad3 and an image ad4 corresponding to an upper view and a lower view with respect to the specific view port are added to one side of the panorama image Pn.

Accordingly, the annotator may easily recognize what is present in the upper region and the lower region in which distortion is severe.

According to various embodiments, the question answering system 1 may add an image ad1 or ad2 including at least a portion of a discontinuous object to one side of the panorama image Pn, and add images ad3 and ad4 corresponding to the upper view and/or lower view to a side of the images ad1 or ad2 including the at least a portion of the discontinuous object.

The method and system for providing an interface for visual question answering are not limited to the above embodiments, and the foregoing embodiments should be regarded as illustrative rather than limiting in all aspects.

Therefore, a person having ordinary skilled in the art will appreciate that other specific modifications are possible without departing from the technical spirit or essential features of the disclosure. The scope of the present disclosure is not defined by the above embodiments but by the appended claims of the present disclosure, and the present disclosure is to cover all modifications, equivalents, and alternatives falling within the spirit and scope of the present disclosure.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the present disclosure is implemented to generate a panorama image that is easy to be recognized by an annotator, thereby constructing an environment in which the annotator can provide an accurate answer to a question about an image.

The present disclosure is implemented to allow an annotator to easily recognize a panorama image even without professional equipment, such as a virtual reality (VR) device.

What is claimed is:

1. A method of providing an interface for visual question answering, the method comprising:
    receiving 360-degree video data;
    acquiring a plurality of images corresponding to a plurality of fields of view (FOV) based on the 360-degree video data;
    identifying a plurality of objects included in the plurality of images and storing metadata regarding the plurality of objects, the metadata including plane coordinates of a plane coordinate system for each object of the plurality of objects;
    converting the plane coordinates of each object of the plurality of objects into respective spherical coordinates of a spherical coordinate system based on the stored metadata;
    classifying the plurality of objects into a plurality of lists according to labels based on the metadata;
    selecting a first object having a highest correct answer probability from among a plurality of first objects, the plurality of first objects being included in a first list corresponding to a first label from among the plurality of lists;
    comparing the spherical coordinates of the first object having the highest correct answer probability to the spherical coordinates of each of the remaining first objects of the plurality of first objects;
    removing, based on a result of the comparison of the spherical coordinates of the first object, a first object satisfying a preset condition among the remaining first objects from the plurality of images; and
    generating an interface for visual question answering, the interface being based on the plurality of images in which the first object satisfying the preset condition is removed by the removing step, wherein classifying the plurality of objects into the plurality of lists further includes arranging the plurality of first objects in a descending order based on a correct answer probability to thereby generate the first list, and wherein selecting the first object having the highest correct answer probability further includes selecting a first object arranged first in the first list.

2. The method of claim 1, further comprising:

selecting a second object having a highest correct answer probability from among a plurality of second objects included in a second list corresponding to a second label from among the plurality of lists;

comparing the spherical coordinates of the second object having the highest correct answer probability to the spherical coordinates of each of the remaining second objects of the plurality of second objects;

removing, based on a result of the comparison of the spherical objects of the second object, a second object satisfying a preset condition among the remaining second objects from the plurality of images; and wherein the generating the interface for visual question answering step is further based on the plurality of images in which the second object satisfying the preset condition is removed.

3. The method of claim 1, wherein in the spherical coordinate system, the removed first object satisfying the preset condition overlaps the first object having the highest correct answer probability by an overlapping area amount that is greater than or equal to a threshold area.

4. The method of claim 1, further comprising:

adopting the first object having the highest correct answer probability as a correct answer for the first label and removing the first object having the highest correct answer from the first list; and removing the first object satisfying the preset condition from the first list.

5. The method of claim 4, further comprising:

reperforming, repeatedly and until all of the plurality of first objects in the first list are removed, the following steps:

(a) the selecting of the first object having the highest correct answer probability step;

(b) the adopting of the first object having the highest correct answer probability as a correct answer for the first label step;

(c) the removing of the first object having the highest correct answer from the first list step; and (d) the removing of the first object satisfying the preset condition from the first list.

6. The method of claim 1, wherein the generating of the interface for the visual question answering step includes processing the plurality of images in which the first object satisfying the preset condition is removed, to thereby generate a panorama image in a specific viewpoint.

7. The method of claim 6, wherein the generating of the interface for the visual question answering step includes, based on a discontinuous object being identified on at least one side of the panorama image, performing a correction for adding an image including at least a portion of the discontinuous object to the at least one side of the panorama image.

8. The method of claim 6, wherein the generating of the interface for the visual question answering step includes:

performing a correction for adding an image corresponding to an upper view with respect to the specific viewpoint among the plurality of images to one side of the panorama image.

9. The method of claim 6, wherein the generating of the interface for the visual question answering step includes:

performing a correction for adding an image corresponding to a lower view with respect to the specific viewpoint among the plurality of images to one side of the panorama image.

10. A system for providing an interface for visual question answering, the system comprising:

at least one memory storage configured to store computer executable and readable instructions; and at least one processor configured to execute the instructions stored in the at least one memory storage, wherein the at least one processor is configured to:

receive 360-degree video data;

acquire a plurality of images corresponding to a plurality of fields of view (FOV) based on the 360-degree video data;

identify a plurality of objects included in the plurality of images and store metadata regarding the plurality of objects, the metadata including plane coordinates for each object of the plurality of objects;

convert the plane coordinates of each object of the plurality of objects into respective spherical coordinates of a spherical coordinate system based on the metadata;

classify the plurality of objects into a plurality of lists according to labels based on the metadata;

select a first object having a highest correct answer probability from among a plurality of first objects, the plurality of first objects being included in a first list corresponding to a first label from among the plurality of lists;

compare the spherical coordinates of the first object having the highest correct answer probability to the spherical coordinates of each of the remaining first objects of the plurality of first objects;

remove, based on a result of the comparison of the spherical coordinates of the first object, a first object satisfying a preset condition among the remaining first objects from the plurality of images;

generate an interface for visual question answering, the interface being based on the plurality of images in which the first object satisfying the preset condition is removed;

arrange the plurality of first objects in a descending order based on a correct answer probability to thereby generate the first list; and select a first object arranged first in the first list as the first object having the highest correct answer probability.

11. The system of claim 10, wherein the at least one processor is further configured to:

select a second object having a highest correct answer probability from among a plurality of second objects included in a second list corresponding to a second label from among the plurality of lists;

compare the spherical coordinates of the second object having the highest correct answer probability to the spherical coordinates of each of the remaining second objects of the plurality of second objects;

remove, based on a result of the comparison of the spherical objects of the second object, a second object satisfying a preset condition among the remaining second objects from the plurality of images; and wherein the interface for visual question answering is further based on the plurality of images in which the second object satisfying the preset condition is removed.

12. The system of claim 10, wherein in the spherical coordinate system, the removed first object satisfying the preset condition overlaps the first object having the highest correct answer probability by an overlapping area amount that is greater than or equal to a threshold area.

13. The system of claim 10, wherein the at least one processor is configured to:
adopt the first object having the highest correct answer probability as a correct answer for the first label and remove the first object having the highest correct answer from the first list; and
remove the first object satisfying the preset condition from the first list.

14. The system of claim 13, wherein the at least one processor is further configured to perform repeatedly and until all of the plurality of first objects in the first list are remove, the following:
(a) a first operation of selecting of the first object having the highest correct answer probability;
(b) a second operation of adopting the first object having the highest correct answer probability as a correct answer for the first label;
(c) remove the first object having the highest correct answer from the first list; and
(d) a third operation of removing the first object satisfying the preset condition from the first list.

15. The system of claim 13, wherein the at least one processor is further configured to:
process the plurality of images in which the first object satisfying the preset condition is removed, to thereby generate a panorama image in a specific viewpoint.

16. The system of claim 15, wherein the at least one processor is further configured to, based on a discontinuous object being identified on at least one side of the panorama image, perform a correction for adding an image including at least a portion of the discontinuous object to the at least one side of the panorama image.

17. The system of claim 15, wherein the at least one processor is further configured to:
perform a correction for adding an image corresponding to an upper view with respect to the specific viewpoint among the plurality of images to one side of the panorama image.

18. The system of claim 15, wherein the at least one processor is further configured to:
perform a correction for adding an image corresponding to a lower view with respect to the specific viewport among the plurality of images to one side of the panorama image.

* * * * *